United States Patent
Hsiao et al.

(10) Patent No.: US 12,088,030 B2
(45) Date of Patent: Sep. 10, 2024

(54) POWER CONNECTOR AND POWER CONNECTOR ASSEMBLY

(71) Applicant: BIZLINK INTERNATIONAL CORP., New Taipei (TW)

(72) Inventors: Hsin-Tuan Hsiao, New Taipei (TW); Shi-Jung Chen, New Taipei (TW)

(73) Assignee: BIZLINK INTERNATIONAL CORP., New Taipei (TW)

( * ) Notice: Subject to any disclaimer, the term of this patent is extended or adjusted under 35 U.S.C. 154(b) by 355 days.

(21) Appl. No.: 17/725,980

(22) Filed: Apr. 21, 2022

(65) Prior Publication Data

US 2022/0352664 A1    Nov. 3, 2022

(30) Foreign Application Priority Data

Apr. 28, 2021   (TW) ................................. 110115451

(51) Int. Cl.
  *H01R 13/02*   (2006.01)
  *H01R 4/62*    (2006.01)
  *H01R 13/506*  (2006.01)
  *H01R 13/64*   (2006.01)

(52) U.S. Cl.
  CPC .......... *H01R 13/025* (2013.01); *H01R 4/625* (2013.01); *H01R 13/506* (2013.01); *H01R 13/64* (2013.01)

(58) Field of Classification Search
  None
  See application file for complete search history.

(56) References Cited

U.S. PATENT DOCUMENTS

| 11,329,413 B2 * | 5/2022 | Hung ................... H01R 13/114 |
| 2019/0287718 A1 | 9/2019 | Ranedo Torres et al. |
| 2020/0244010 A1 * | 7/2020 | Chua ................... H01R 13/629 |
| 2021/0305732 A1 | 9/2021 | Chen |
| 2022/0115817 A1 * | 4/2022 | Huang ............... H01R 13/6471 |

FOREIGN PATENT DOCUMENTS

| TW | I696320 | 6/2020 |
| TW | 202137640 A | 10/2021 |

* cited by examiner

*Primary Examiner* — Oscar C Jimenez
(74) *Attorney, Agent, or Firm* — WPAT, PC

(57) ABSTRACT

A power connector has a casing, a first power terminal, and a second power terminal. The casing has at least one cable-in opening. The first power terminal has a first inner connecting portion and a first outer connecting portion. The first inner connecting portion is secured in the casing and has a first through hole matrix. The first through hole matrix faces the at least one cable-in opening and has multiple first through holes. The first outer connecting portion is located outside of the casing. The second power terminal is basically the same as the first power terminal. The first power terminal is located between the second power terminal and the at least one cable-in opening. The first power terminal shields part of the second power terminal and allows the second through hole matrix of the second power terminal to be exposed to the at least one cable-in opening.

16 Claims, 8 Drawing Sheets

POWER CONNECTOR AND POWER CONNECTOR ASSEMBLY

BACKGROUND OF THE INVENTION

1. Field of the Invention

The present invention relates to a power connector for connecting multiple power cables to enhance the overall current output.

2. Description of the Prior Arts

Due to the highly development of the technologies such as 5G, AI, Edge Computing, and TOT, the data transmission speed has been increased several folds nowadays, and thus the required power is increased as well, which means a higher current is needed.

Conventionally, to enhance the overall current output, multiple power cables are electrically connected to a power terminal to integrate the currents of the power cables, thereby enhancing the overall current output. One of the most common designs is to peel off the insulation layer of an end of the power cable to reveal the core wire, and then riveting the exposed core wire into an end of a ring terminal (or called tubular lug). Afterwards, clamp the ring terminal between a panel and the power terminal, and then fix the ring terminal, the panel, and the power terminal together via screws. However, this design has the following shortcomings:

First, each power cable needs to be riveted to a respective ring terminal, and each ring terminal needs to be screwed with the power connector via a screw. Thus, there are too many components, and thus the structure and the installation are both too complicated.

Second, the power cables are arranged side by side transversely. When the user needs a higher current and increases the amount of the power cables, the power connector needs to be wider to accommodate the side-by-side power cables, which is not efficient in space utilization.

To overcome the shortcomings, the present invention provides a power connector and a power connector assembly to mitigate or obviate the aforementioned problems.

SUMMARY OF THE INVENTION

The main objective of the present invention is to provide a power connector and a power connector assembly with simplified structure and smaller volume, which makes the overall structure more compact.

The power connector has a casing, a first power terminal, and a second power terminal. The casing has at least one cable-in opening. The first power terminal has a first inner connecting portion and a first outer connecting portion. The first inner connecting portion is secured in the casing and has a first through hole matrix. The first through hole matrix faces the at least one cable-in opening and has multiple first through holes. The first outer connecting portion is located outside of the casing. The second power terminal has a second inner connecting portion and a second outer connecting portion. The second inner connecting portion is secured in the casing and has a second through hole matrix. The second through hole matrix faces the at least one cable-in opening and has multiple second through holes. The second outer connecting portion is located outside of the casing. The first power terminal is located between the second power terminal and the at least one cable-in opening. The first power terminal shields or blocks at least a part of the second power terminal from the cable-in opening and allows the second through hole matrix of the second power terminal to be exposed to the at least one cable-in opening.

The power connector assembly comprises the aforementioned power connector and multiple power cables. Each one of the power cables has at least one core wire. The core wires of some of the power cables are respectively soldered with the first through holes of the power connector, and the core wires of the other power cables are respectively soldered with the second through holes of the power connector.

The power connector assembly comprises a casing, a first power terminal, a second power terminal, and multiple power cables. The casing has at least one cable-in opening. The first power terminal has a first inner connecting portion and a first outer connecting portion. The first inner connecting portion is located in the casing and has a first inner connecting panel with multiple first through holes formed thereon. The first outer connecting portion is located outside of the casing. The second power terminal has a second inner connecting portion and a second outer connecting portion. The second inner connecting portion is located in the casing and has a second inner connecting panel with multiple second through holes formed thereon. The second outer connecting portion is located outside of the casing. The first inner connecting panel and the second inner connecting panel are spaced apart from each other along a direction toward the cable-in opening. The multiple first through holes of the first power terminal are offset to the multiple second through holes of the second power terminal for allowing the multiple first through holes and the multiple second through holes to be exposed to the at least one cable-in opening. Core wires of some of the power cables are respectively inserted into and soldered with the first through holes of the power connector, and core wires of the other power cables are respectively inserted into and soldered with the second through holes of the power connector.

The following are the advantages of a preferred embodiment of the present invention.

With the through hole (first through hole/second through hole) formed on the power terminal (first power terminal/second power terminal), the core wire of the power cable can be directly inserted into and is soldered with the through hole, thereby fixing the power cable on the power terminal, which effectively simplifies the connecting structure between the power cable and the power terminal.

Further, first, the two power terminals are front-rear arranged in a vertically staggered manner. Second, each one of the power terminals has multiple through holes for connecting multiple power cables. Third, the first power terminal is located in the middle but does not block the power cables of the second power terminal. With the aforesaid three features, the power cables of the two power terminals are also arranged in a staggered manner that is similar to vertically overlapping, so that the power connector can accommodate more power cables in a limited space to enhance the overall current output. As a result, the present invention can effectively utilize the space, enhance the current output, and simplify both the structure and the assembling process.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
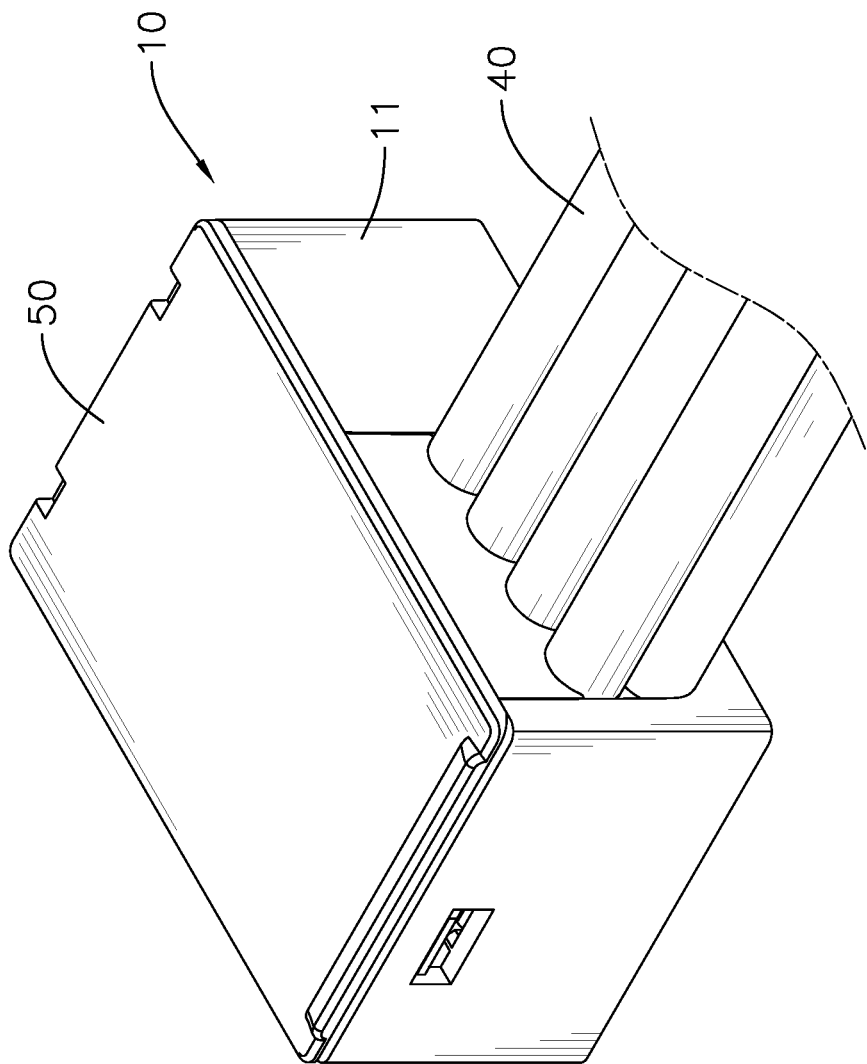
FIG. 1 is a perspective view of a power connector assembly in accordance with the present invention.
Figure 2:
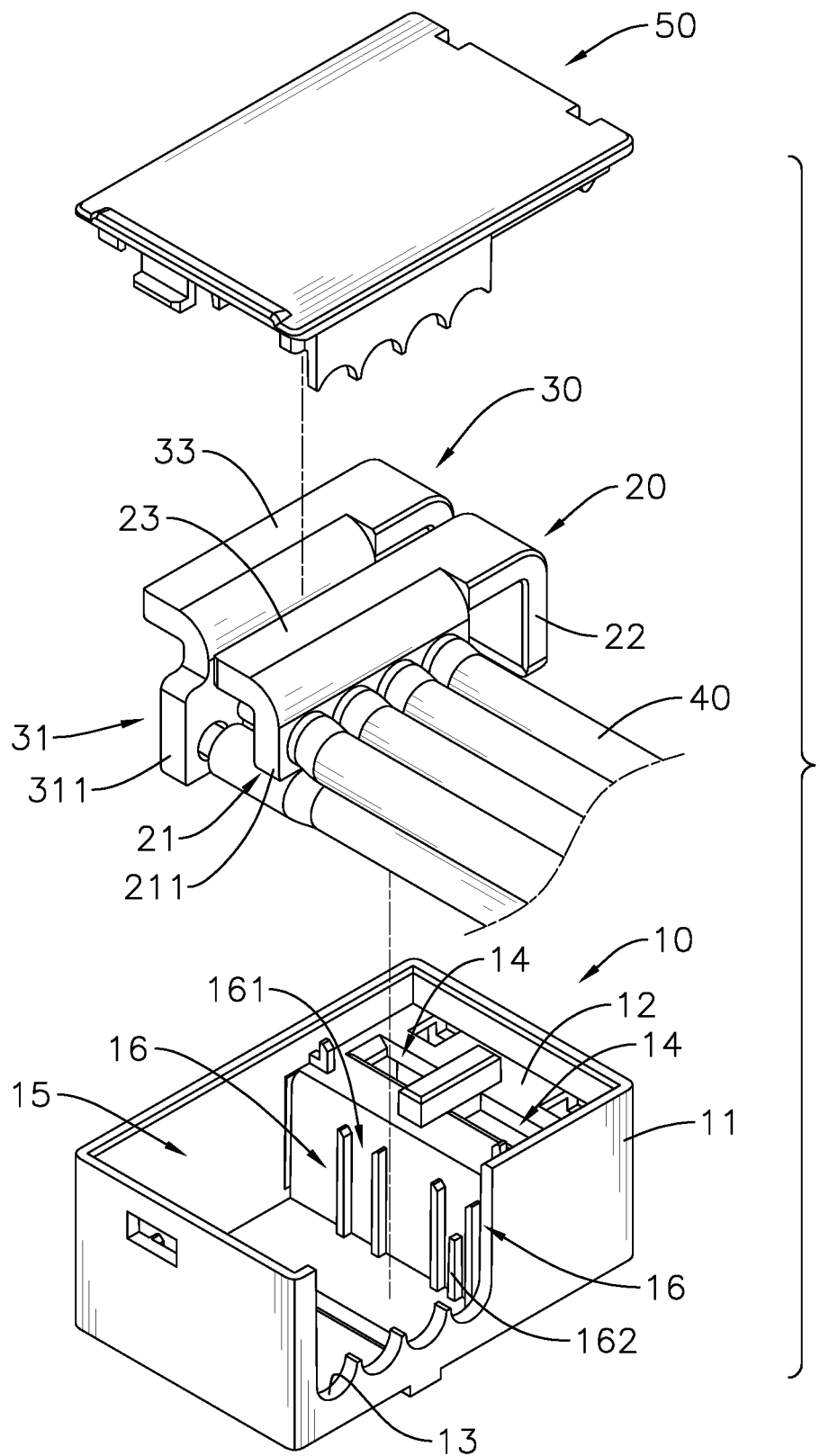
FIGS. 2 and 3 are exploded perspective views of the power connector assembly in FIG. 1.

With reference to FIGS. 1 and 2, in a preferred embodiment of the present invention, the power connector assembly has a power connector and multiple power cables 40. The power connector has a casing 10, a first power terminal 20, and a second power terminal 30. In this embodiment, the power connector is only used for supplying power without transmitting signal. As a result, the terminals of the power connector are power terminals rather than signal terminals, and the cables are power cables rather than signal cables. However, the said power connector can optionally utilized to accommodate a signal cable for transmitting signal in other embodiments.

Figure 3:
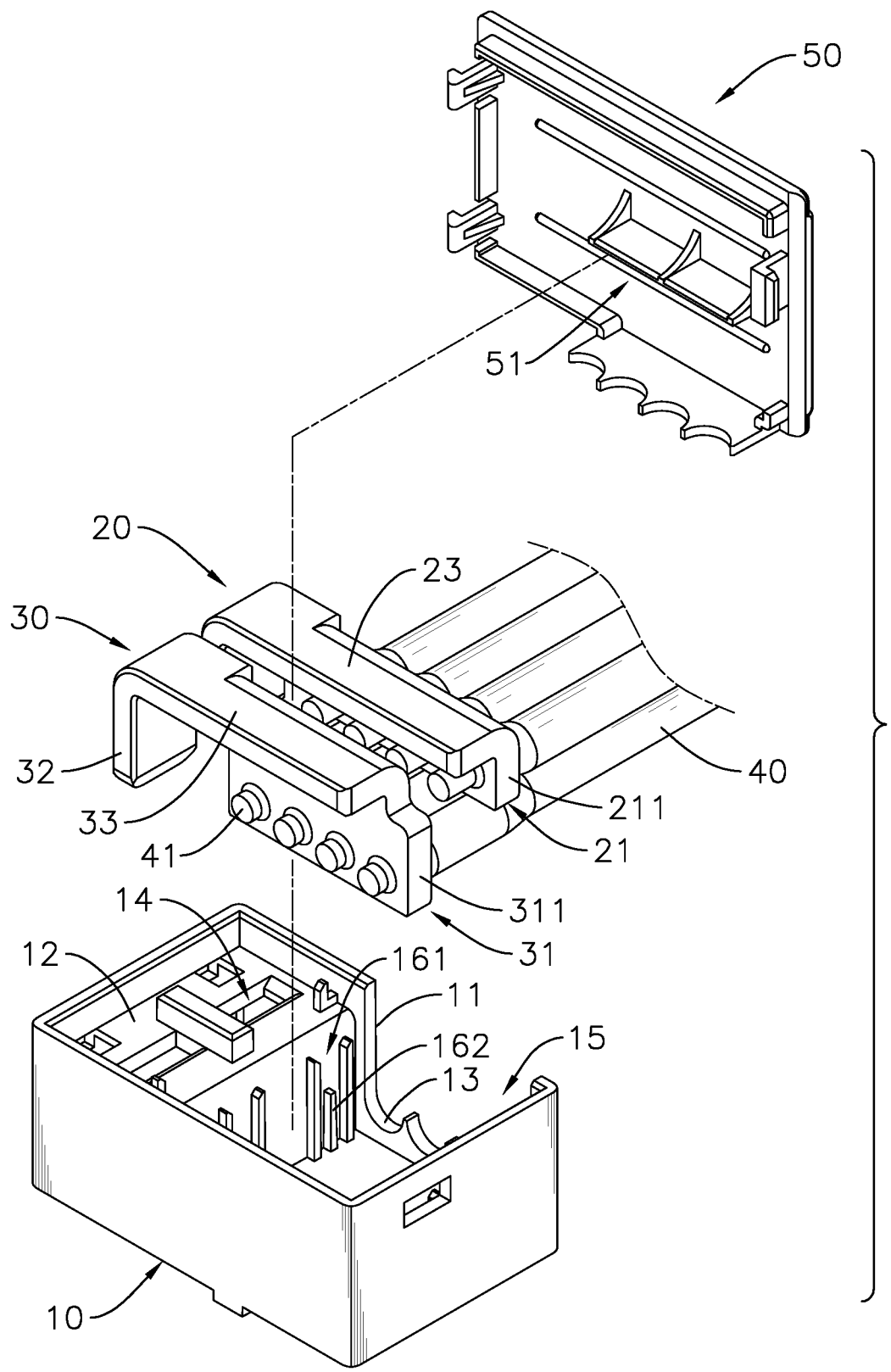
Figure 4:
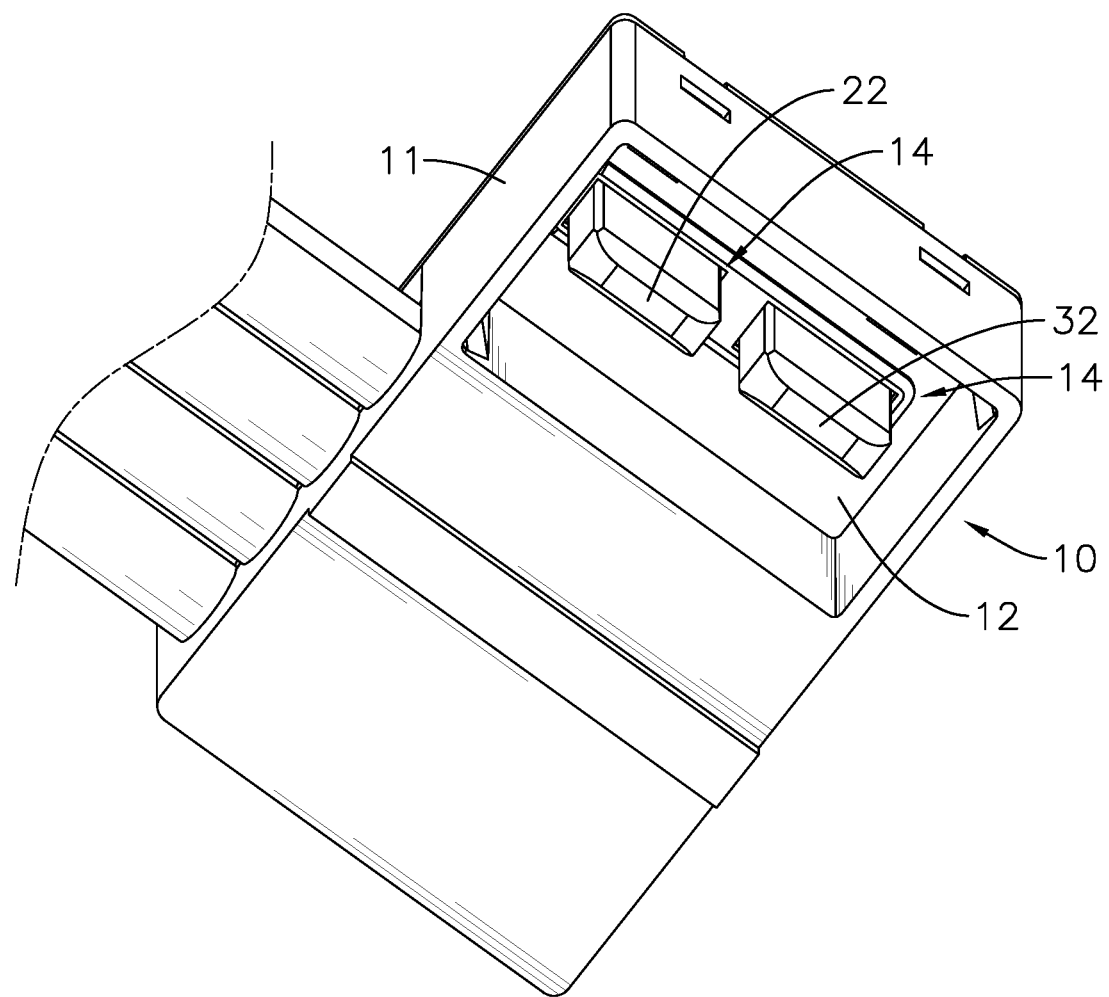
FIG. 4 is another perspective view of the power connector assembly in FIG. 1.

With reference to FIGS. 2 to 4, the casing 10 has at least one cable-in opening 13 and at least one cable-out opening 14. In a preferred embodiment, the amount of the cable-in opening 13 is one, and the one single cable-in opening 13 is for all the power cables 40 to insert therein. The amount of the cable-out opening 14 is two, and the two cable-out openings 14 are respectively for the first power terminal 20 and the second power terminal 30 to penetrate out. But it is not limited thereto. The amount of the cable-in opening 13 may be multiple for the multiple power cables 40 to respectively insert therein. The amount of the cable-out opening 14 may be one for the first power terminal 20 and the second power terminal 30 together to penetrate out.

In a preferred embodiment, the casing 10 has a rectangular structure, which has a first end surface 11 and a second end surface 12. The first end surface 11 is the surface to form the cable-in opening 13. The second end surface 12 is the surface to form the cable-out opening 14. A normal of the first end surface 11 and a normal of the second end surface 12 are perpendicular to each other. That is, the cable-in opening 13 and the cable-out opening 14 are respectively located in two perpendicular surfaces. But the positions of the cable-in opening 13 and the cable-out opening 14 are not limited thereto.

In a preferred embodiment, the casing 10 has an end opening 15, which is covered by a cover 50. Preferably, the casing 10 and the cover 50 together form the cable-in opening 13, but it is not limited thereto. The cable-in opening 13 may be formed on the casing 10 only.

Figure 5:
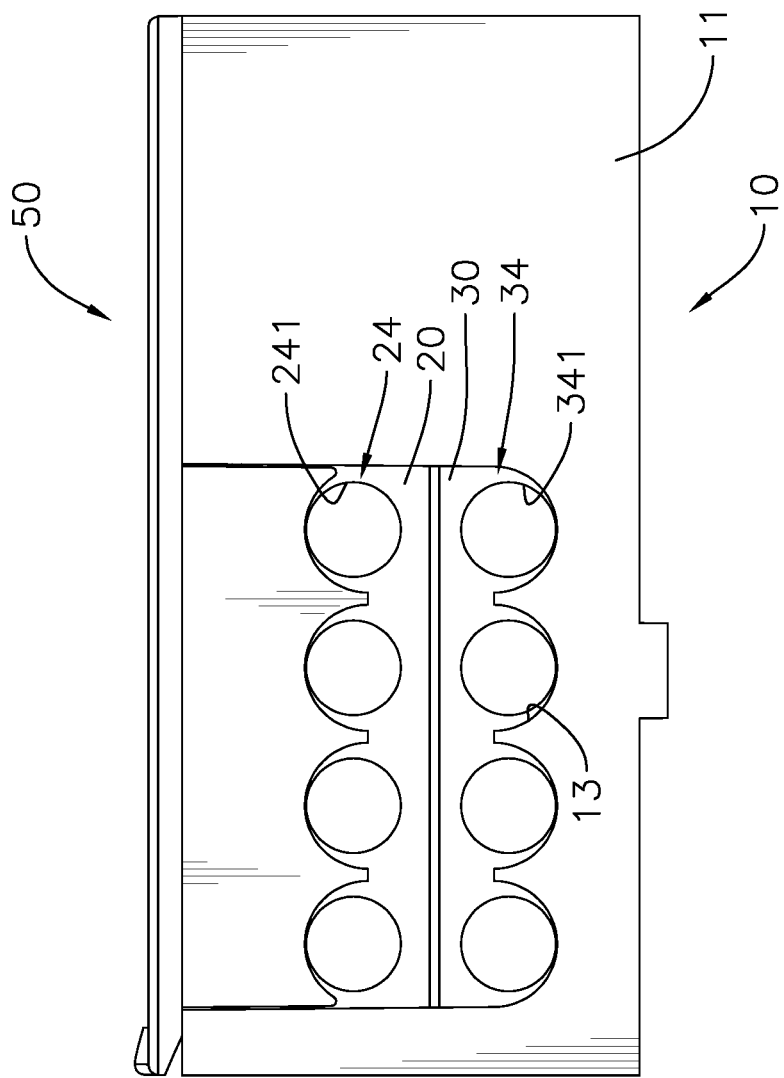
FIG. 5 is a front view of a cable-in opening of a power connector of the power connector assembly in FIG. 1.

With reference to FIGS. 2, 3, and 5, the first power terminal 20 has a first inner connecting portion 21 and a first outer connecting portion 22. The first inner connecting portion 21 is secured in the casing 10 and has a first through hole matrix 24 facing the cable-in opening 13. The first through hole matrix 24 has multiple first through holes 241. The first through hole matrix 24 is a M×N matrix. Any one of M and N can be one, and the other of M and N is at least two. Each one of the first through holes 241 is for one of the power cables 40 to insert therein. In a preferred embodiment, to enhance the loadable current of each power cable 40, a diameter of the core wire 41 is equal to or larger than 2 millimeters. Consequently, in a preferred embodiment as shown in FIG. 5, a smallest inner diameter of the first through hole 241 is equal to or larger than 2 millimeters to accommodate the aforementioned core wire 41. The smallest inner diameter can be understood as a length of the shortest straight line between any two points (not limited to points on the same surface) in the first through hole and said straight line must pass through the axis of the first through hole. But the diameter of the core wire 41 and the smallest inner diameter of the first through hole 241 are not limited to the aforementioned size range. The first outer connecting portion 22 is located outside of the casing 10. To be specific, the first outer connecting portion 22 penetrates out of the casing 10 through the cable-out opening 14 for the male output.

Figure 7:
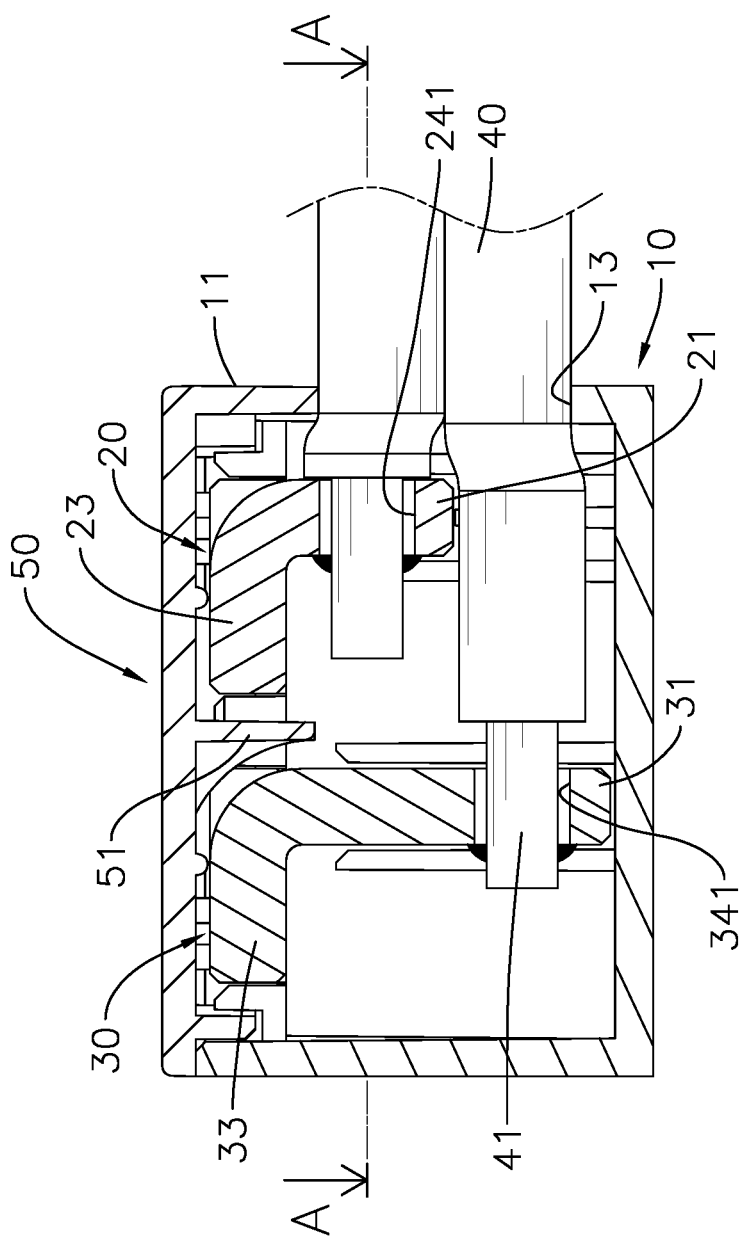
FIG. 7 is a sectional view along line B-B of FIG. 6.

In a preferred embodiment, the first power terminal 20 further comprises a first middle segment 23 connected between the first inner connecting portion 21 and the first outer connecting portion 22. Preferably, the first inner connecting portion 21 and the first outer connecting portion 22 are both vertically bent from the first middle segment 23, such that the first middle segment 23 can attach to an inner wall of the casing 10 or the cover 50 via a surface as shown in FIG. 7. Therefore, the first power terminal 20 can be securely mounted in the casing 10. But the structure or the shape of the first power terminal 20 is not limited thereto.

With reference to FIGS. 2, 3, and 5, the second power terminal 30 has a second inner connecting portion 31 and a second outer connecting portion 32. The second inner connecting portion 31 is secured in the casing 10 and has a second through hole matrix 34 facing the cable-in opening 13. The second through hole matrix 34 has multiple second through holes 341. In a preferred embodiment, the second through hole matrix 34 and the second through hole 341 are identical in concept to the first through hole matrix 24 and the first through hole 241. The second through hole matrix 34 is a M×N matrix. Any one of M and N can be one, and the other of M and N is at least two. Each one of the second through holes 341 is for one of the power cables 40 to insert therein. In a preferred embodiment, to enhance the loadable current of each power cable 40, a diameter of the core wire 41 is equal to or larger than 2 millimeters. Consequently, in a preferred embodiment as shown in FIG. 5, a smallest inner diameter of the second through hole 341 is equal to or larger than 2 millimeters to accommodate the aforementioned core wire 41. The smallest inner diameter can be understood as a length of the shortest straight line between any two points (not limited to points on the same surface) in the first through hole and said straight line must pass through the axis of the first through hole. But the diameter of the core wire 41 and the smallest inner diameter of the second through hole 341 are not limited to the aforementioned size range. The second outer connecting portion 32 is located outside of the casing 10. To be specific, the second outer connecting portion 32 penetrates out of the casing 10 through the cable-out opening 14 for the male output.

In a preferred embodiment, the second power terminal 30 further comprises a second middle segment 33 connected between the second inner connecting portion 31 and the second outer connecting portion 32. Preferably, the second inner connecting portion 31 and the second outer connecting portion 32 are both vertically bent from the second middle segment 33, such that the second middle segment 33 can attach to an inner wall of the casing 10 or the cover 50 via a surface as shown in FIG. 7. Therefore, the second power terminal 30 can be securely mounted in the casing 10. But the structure or the shape of the second power terminal 30 is not limited thereto.

With reference to FIGS. 5 and 7, the first power terminal 20 is located between the second power terminal 30 and the cable-in opening 13 of the casing 10. The first power terminal 20 shields or blocks at least a part of the second power terminal 30 from the cable-in opening 13 and allows the second through hole matrix 34 of the second power terminal 30 to be exposed to the cable-in opening 13. As a result, the first power terminal 20 does not block the power cable 40, which passes through the cable-in opening 13, to be inserted into the second through hole matrix 34 of the second power terminal 30. In other words, to see the inner side of the casing 10 from the cable-in opening 13, the first through hole matrix 24 and the second through hole matrix 34 are both as shown in FIG. 5.

Figure 6:
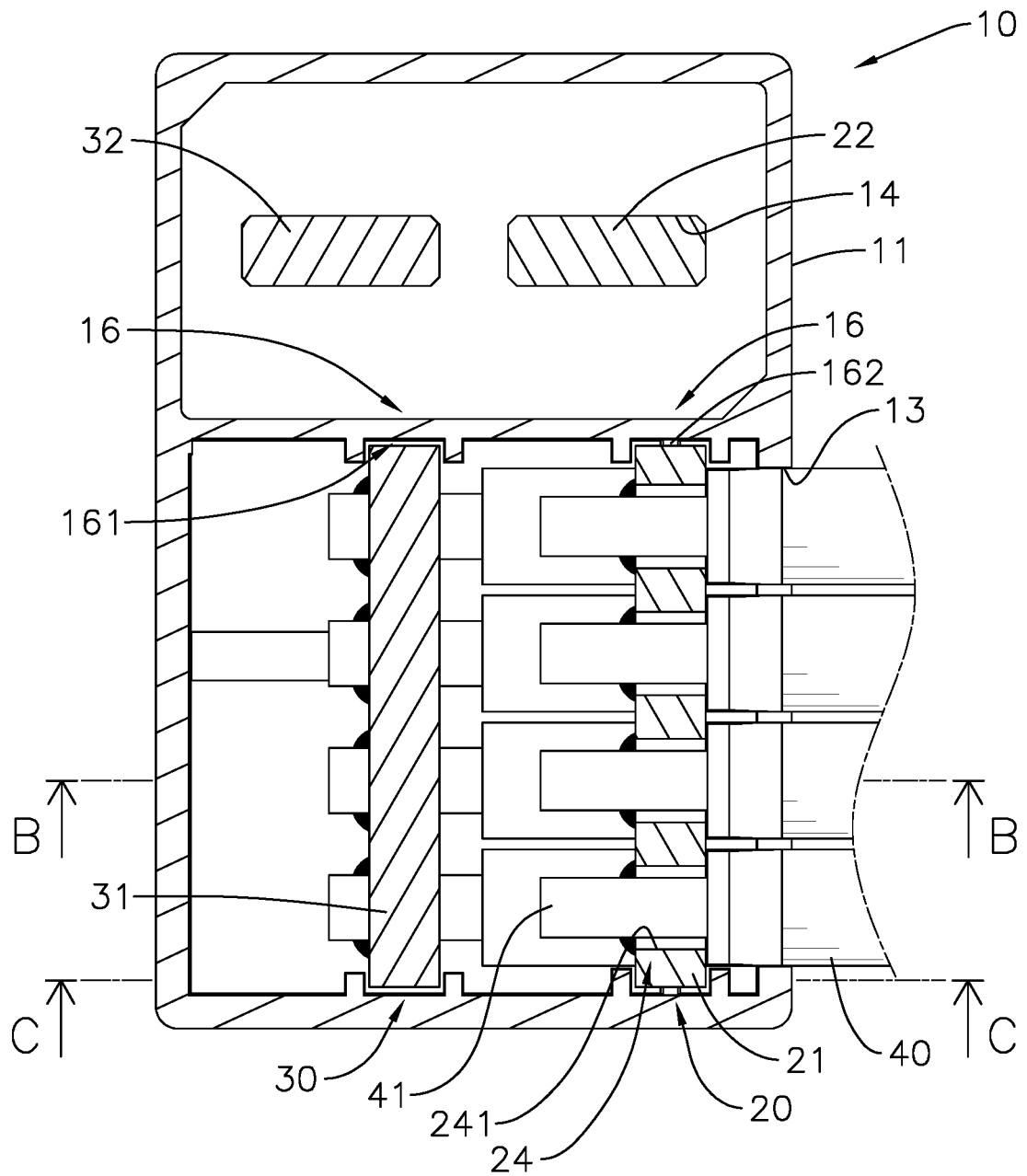
FIG. 6 is a sectional view along line A-A of FIG. 7.

With reference to FIGS. 2, 6, and 7, in a preferred embodiment, the first inner connecting portion 21 of the first power terminal 20 has a first inner connecting panel 211. The first through hole matrix 24 is formed on a first surface of the first inner connecting panel 211. The second inner connecting portion 31 of the second power terminal 30 has a second inner connecting panel 311. The second through hole matrix 34 is formed on a second surface of the second inner connecting panel 311. A normal of the first surface of the first inner connecting panel 211 and a normal of the second surface of the second inner connecting panel 311 both pass through the cable-in opening 13 of the casing 10. In other words, if the power cable 40 vertically penetrates the first inner connecting panel 211 and the second inner connecting panel 311, the extending direction of the power cable 40 is perpendicular to the cable-in opening 13, thereby avoiding the deviation of the power cable 40 relative to the cable-in opening 13. But it is not limited thereto. The power cable 40 may be obliquely inserted into the cable-in opening 13 when needed.

The first inner connecting panel 211 of the first power terminal 20 and the second inner connecting panel 311 of the second power terminal 30 are spaced apart from each other along a direction toward the cable-in opening 13 of the casing 10. The first inner connecting panel 211 and the second inner connecting panel 311 are arranged in a staggered manner to make the first through holes 241 of the first power terminal 20 and the second through holes 341 of the second power terminal 30 respectively exposed to the cable-in opening 13 as shown in FIG. 5.

With reference to FIGS. 2 and 3, in a preferred embodiment, the first power terminal 20 and the second power terminal 30 are both integrally formed, which means the first power terminal 20 or the second power terminal 30 is formed as one piece or consists of multiple components. The multiple components are connected together to form a complete unit or element, and said unit or element cannot be disassembled easily without destroying the integrity of said unit or element (for example, multiple components are soldered to form the power terminal).

With reference to FIGS. 3 and 7, in a preferred embodiment, the cover 50 has a protruding structure 51 on a surface of the cover 50. When the cover 50 covers the end opening 15 of the casing 10, the protruding structure 51 separates the first power terminal 20 and the second power terminal 30 as shown in FIG. 7, thereby preventing the first power terminal 20 and the second power terminal 30 contacting each other.

With reference to FIGS. 2, 3, 6, and 8, in a preferred embodiment, the casing 10 has two positioning recess assemblies 16 formed on the inner wall of the casing 10. The two positioning recess assemblies 16 respectively correspond to the first power terminal 20 and the second power terminal 30. Each one of the positioning recess assemblies 16 has two positioning recesses 161, which are respectively formed on two opposite surfaces of the inner wall of the casing 10. Two opposite sides of the first power terminal 20 or two opposite sides of the second power terminal 30 are respectively inserted into and engage with the two positioning recesses 161, thereby securely mounting the first power terminal 20 and the second power terminal 30 in the casing 10. In a preferred embodiment, each one of the positioning recesses 161 is formed between two ribs, which are formed on the inner wall of the casing 10. But it is not limited thereto. The positioning recess 161 may be directly concaved in the inner wall of the casing 10.

Figure 8:
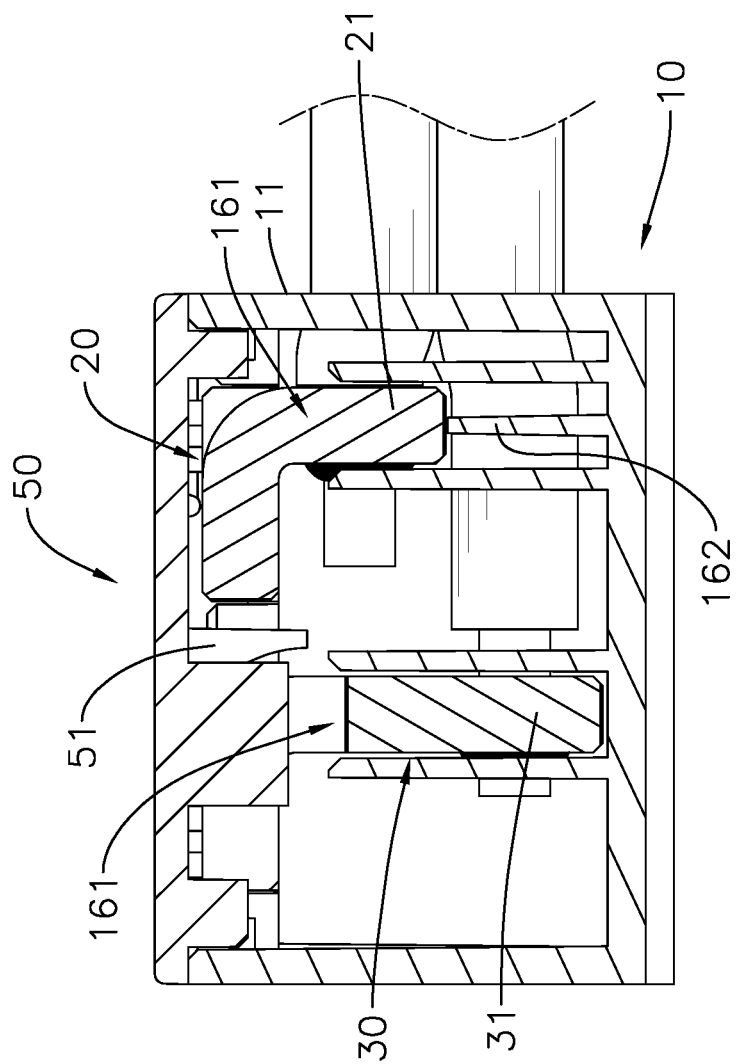
FIG. 8 is a sectional view along line C-C of FIG. 6.

Furthermore, in the positioning recess assembly 16 that corresponds to the first power terminal 20 (between the second power terminal 30 and the cable-in opening 13), each one of the positioning recesses 161 has a supporting segment 162, which is formed inside the positioning recess 161. The first power terminal 20 abuts the two supporting segments 162 of the two positioning recesses 161 to be supported. Therefore, the first power terminal 20 and the second power terminal 30 are located at different heights as shown in FIG. 8, thereby preventing the first power terminal 20 from blocking the power cables 40 that are connected to the second power terminal 30.

With reference to FIGS. 3, 6, and 7, the power cables 40 are respectively inserted into the first through holes 241 and the second through holes 341. Each one of the power cables 40 has at least one core wire 41, and the core wire 41 of each one of the power cables 40 is inserted into and is soldered with one of the first through holes 241 of the first power terminal 20 or one of the second through holes 341 of the second power terminal 30. Therefore, each one of the power terminals 20, 30 can accumulate the currents of the multiple power cables 40 soldered on said power terminal 20, 30, and then outputs from the outer connecting portion 22, 32. The output voltages of the power terminals 20, 30 are still the same as the voltage of each one of power cables 40. The two power terminals 20, 30 can be used as a live wire and a neutral wire respectively.

When the present invention is assembled, preferably, the multiple power cables 40 are inserted into and soldered with the first power terminal 20 or the second power terminal 30 first. Then, the two power terminals 20, 30 are put in the casing 10 from the end opening 15. Finally, the cover 50 covers the casing 10. After the simple installation, the first outer connecting portion 22 and the second outer connecting portion 32 out of the cable-out opening 14 can be used as output terminals, and the currents of the multiple power cables are integrated to enhance the current output.

The power terminals 20, 30 form the through holes 241, 341, such that the core wire 41 of the power cable 40 can be directly inserted into and is soldered with the through holes 241, 341, thereby fixing the power cable 40 on the power terminals 20, 30, which effectively simplifies the connecting structure between the power cable 40 and the power terminals 20, 30.

Further, the power connector comprises two power terminals 20, 30, and each one of the power terminals 20, 30 has multiple through holes 241, 341 to connect multiple power cables 40. Besides, the first power terminal 20 is located in the middle but does not block the power cables 40 of the second power terminal 30. As a result, the power cables 40 of the two power terminals 20, 30 can be arranged in a staggered manner similar to vertically overlapping the power cables 40, so that the power connector can accommodate more power cables in a limited space to enhance the overall current output (increasing the amount of the power cables is the only way to enhance the overall current output).

The present invention effectively utilizes the space, enhances the overall current output, and simplifies both the structure and the assembling process.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A power connector, comprising:
   a casing, having at least one cable-in opening;
   a first power terminal, having a first inner connecting portion and a first outer connecting portion, the first inner connecting portion being secured in the casing, the first outer connecting portion located outside of the casing; the first inner connecting portion having a first through hole matrix, the first through hole matrix facing the at least one cable-in opening and having multiple first through holes;
   a second power terminal, having a second inner connecting portion and a second outer connecting portion, the second inner connecting portion being secured in the casing, the second outer connecting portion located outside of the casing; the second inner connecting portion having a second through hole matrix, the second through hole matrix facing the at least one cable-in opening and having multiple second through holes;
   wherein, the first power terminal is located between the second power terminal and the at least one cable-in opening; the first power terminal shields or blocks at least a part of the second power terminal from the at least one cable-in opening and allows the second through hole matrix of the second power terminal to be exposed to the at least one cable-in opening.

2. The power connector as claimed in claim 1, wherein the first inner connecting portion has
   a first inner connecting panel; the first through hole matrix formed on a first surface of the first inner connecting panel;
   the second inner connecting portion has
   a second inner connecting panel; the second through hole matrix formed on a second surface of the second inner connecting panel; and
   a normal of the first surface and a normal of the second surface both pass through the at least one cable-in opening.

3. The power connector as claimed in claim 2, wherein the first power terminal is integrally formed, and the second power terminal is integrally formed.

4. The power connector as claimed in claim 3, wherein
   a smallest inner diameter of each one of the first through holes is equal to or larger than 2 millimeters; and
   a smallest inner diameter of each one of the second through holes is equal to or larger than 2 millimeters.

5. The power connector as claimed in claim 4, wherein the casing has a rectangular structure, and the rectangular structure has a first end surface and a second end surface; a normal of the first end surface and a normal of the second end surface are perpendicular to each other; the at least one cable-in opening is formed on the first end surface; the second end surface has at least one cable-out opening for the first outer connecting portion and the second outer connecting portion to penetrate out of the casing.

6. The power connector as claimed in claim 5, wherein the casing has
   two positioning recesses; the two positioning recesses formed on an inner wall of the casing; and
   two opposite sides of the first power terminal are inserted into and engage with the two positioning recesses respectively.

7. The power connector as claimed in claim 6, wherein each one of the two positioning recesses has a supporting segment; the first power terminal abuts on the two supporting segments of the two positioning recesses to make the first power terminal and the second power terminal located at different heights.

8. The power connector as claimed in claim 7 further comprising:
   a cover having a protruding structure on a surface of the cover; when the cover covers an end opening of the casing, the protruding structure separates the first power terminal and the second power terminal.

9. The power connector as claimed in claim 1, wherein the first power terminal is integrally formed, and the second power terminal is integrally formed.

10. The power connector as claimed in claim 1, wherein
    a smallest inner diameter of each one of the first through holes is equal to or larger than 2 millimeters; and
    a smallest inner diameter of each one of the second through holes is equal to or larger than 2 millimeters.

11. The power connector as claimed in claim 1, wherein the casing has a rectangular structure, and the rectangular structure has a first end surface and a second end surface; a normal of the first end surface and a normal of the second end surface are perpendicular to each other; the at least one cable-in opening is formed on the first end surface; the second end surface has at least one cable-out opening for the first outer connecting portion and the second outer connecting portion to penetrate out of the casing.

12. The power connector as claimed in claim 1, wherein the casing has
    two positioning recesses; the two positioning recesses formed on an inner wall of the casing; and
    two opposite sides of the first power terminal are inserted into and engage with the two positioning recesses respectively.

13. The power connector as claimed in claim 12, wherein each one of the two positioning recesses has a supporting segment; the first power terminal abuts on the two supporting segments of the two positioning recesses to make the first power terminal and the second power terminal located at different heights.

14. The power connector as claimed in claim 1 further comprising:
    a cover having a protruding structure on a surface of the cover; when the cover covers an end opening of the casing, the protruding structure separates the first power terminal and the second power terminal.

15. A power connector assembly comprising:
    a power connector as claimed in claim 1; and
    multiple power cables, each one of the power cables having at least one core wire; the core wires of some of the power cables respectively soldered with the first through holes of the power connector, and the core wires of the other power cables respectively soldered with the second through holes of the power connector.

16. A power connector assembly comprising:
    a casing having at least one cable-in opening;

a first power terminal, the first power terminal having a first inner connecting portion located in the casing and a first outer connecting portion located outside of the casing, the first inner connecting portion comprising a first inner connecting panel with multiple first through holes formed thereon;

a second power terminal, the second power terminal having a second inner connecting portion located in the casing and a second outer connecting portion located outside of the casing, the second inner connecting portion comprising a second inner connecting panel with multiple second through holes formed thereon;

wherein the first inner connecting panel and the second inner connecting panel are spaced apart from each other along a direction toward the cable-in opening; the multiple first through holes of the first power terminal being offset to the multiple second through holes of the second power terminal for allowing the multiple first through holes and the multiple second through holes to be exposed to the at least one cable-in opening;

multiple power cables; core wires of some of the power cables respectively inserted into the first through holes of the power connector, and core wires of the other power cables respectively inserted into the second through holes of the power connector.

* * * * *